(12) United States Patent
Cambra et al.

(10) Patent No.: US 11,908,068 B2
(45) Date of Patent: Feb. 20, 2024

(54) AUGMENTED REALITY METHODS AND SYSTEMS

(71) Applicant: THE COURT OF EDINBURGH NAPIER UNIVERSITY, Edinburgh Lothian (GB)

(72) Inventors: Llogari Casas Cambra, London (GB); Kenneth John Mitchell, Lanark (GB)

(73) Assignee: THE COURT OF EDINBURGH NAPIER UNIVERSITY, Edinburgh Lothian (GB)

( * ) Notice: Subject to any disclaimer, the term of this patent is extended or adjusted under 35 U.S.C. 154(b) by 235 days.

(21) Appl. No.: 17/401,746

(22) Filed: Aug. 13, 2021

(65) Prior Publication Data

US 2022/0068010 A1     Mar. 3, 2022

Related U.S. Application Data

(63) Continuation of application No. PCT/GB2020/050345, filed on Feb. 14, 2020.

(30) Foreign Application Priority Data

Feb. 14, 2019 (GB) ..................... 1902028

(51) Int. Cl.
    *G06T 19/00*      (2011.01)
    *G06T 15/20*      (2011.01)
    (Continued)

(52) U.S. Cl.
    CPC .......... *G06T 15/205* (2013.01); *G06T 13/205* (2013.01); *G06T 13/40* (2013.01);
    (Continued)

(58) Field of Classification Search
None
See application file for complete search history.

(56) References Cited

PUBLICATIONS

Singh et al., "A detailed analysis of data consistency concepts in data exchange formats (JSON & XML)", IEEE, 2017. (Year: 2017).*

(Continued)

*Primary Examiner* — Nicholas R Wilson
(74) *Attorney, Agent, or Firm* — Matthew M. Hulihan; Heslin Rothenberg Farley & Mesiti PC

(57) ABSTRACT

Methods and systems employing augmented reality techniques via real-world objects for various purposes. Computer implemented methods are provided for animated augmentation of real-time video of static real-world objects. A computing device receives first data defining features and movements of a human subject, captures a video image of an object having features corresponding to human features, maps features defined by first data to corresponding features of the object, and uses the first data to animate the corresponding features of the object to correspond with the movements of the human subject defined by the first data. The object may be a physical 3D object. Embodiments may include positioning and orienting a 3D mesh representation of the object in registration with the object video image, prior to mapping the features defined by the first data to corresponding features on the 3D mesh. Recorded audio messages may be played in synchronism with the object.

31 Claims, 12 Drawing Sheets

(51) Int. Cl.
    *G06V 20/20*      (2022.01)
    *G06V 40/16*      (2022.01)
    *G06V 20/40*      (2022.01)
    *G06T 13/20*      (2011.01)
    *G06T 13/40*      (2011.01)
    *G06T 15/04*      (2011.01)
    *G06T 17/20*      (2006.01)

(52) U.S. Cl.
    CPC .............. *G06T 15/04* (2013.01); *G06T 17/20* (2013.01); *G06T 19/006* (2013.01); *G06V 20/20* (2022.01); *G06V 20/46* (2022.01); *G06V 40/171* (2022.01); *G06V 40/176* (2022.01); *G06T 2215/16* (2013.01)

(56) References Cited

PUBLICATIONS

Alattar et al., "Improved Selective Encryption Techniques for Secure Transmission of MPEG Video Bit-Streams", 1999. (Year: 1999).*

Casas et al., Image Based Proximate Shadow Retargeting, EG UK Computer Graphics & Visual Computing, (2018), 8 pages.

Fairchild et al., A Mixed Reality Telepresence System for Collaborative Space Operation, Transactions on Circuits and Systems for Video Technology, IEEE, (2017), 15 pages.

International Preliminary Report on Patentability for International Application No. PCT/GB2020/050345, dated Aug. 10, 2021, 10 pages, International Bureau of WIPO.

International Search Report and Written Opinion for PCT/GB2020/050345 dated Apr. 17, 2020, 12 pages.

Thies et al., FACE2FACE: Real-Time Face Capture and Reenactment of RGB Videos, pp. 2387-2395, 2016 IEEE Conference on Computer Vision and Pattern Recognition, Jun. 27, 2016.

Casas et al., Props Alive: A Framework for Augmented Reality Stop Motion Animation, pp. 1-4, Jan. 1, 2017, Edinburgh Napier University.

Mohr et al., Retargeting Video Tutorials Showing Tools With Surface Contact to Augmented Reality, pp. 6547-6558, Proceedings of the 2017 CHI Conference on Human Factors in Computing Systems, CHI 2017, May 6-11, 2017, Denver, CO, USA.

* cited by examiner

| | | | Object [1] |
|---|---|---|---|
| frame | | | Object [2] |
| | blendShape | | Object [51] |
| | | eyeBlink_R | Float Number |
| | | eyeWide_R | Float Number |
| | | mouthLowerDown_L | Float Number |
| | | eyeLookDown_R | Float Number |
| | | cheekSquint_L | Float Number |
| | | mouthDimple_R | Float Number |
| | | browInnerUp | Float Number |
| | | eyeLookIn_L | Float Number |
| | | mouthPress_L | Float Number |
| | | mouthStretch_R | Float Number |
| | | ... | |
| | | mouthUpperUp_L | Float Number |
| | | browOuterUp_L | Float Number |
| | | mouthRollUpper | Float Number |
| | | eyeLookUp_R | Float Number |
| | transform | | Object [7] |
| | | positionX | Float Number |
| | | positionY | Float Number |
| | | positionZ | Float Number |
| | | rotationX | Float Number |
| | | rotationY | Float Number |
| | | rotationZ | Float Number |
| | | rotationW | Float Number |

FIG. 2

No reconstruction

Appearance reconstruction

Texture map

Reconstruction map

AUGMENTED REALITY METHODS AND SYSTEMS

CROSS REFERENCE TO RELATED APPLICATIONS

This application claims priority benefit from International Application No. PCT/GB2020/050345 filed on Feb. 14, 2020, which claims priority from Great Britain Application No. 1902028.8 filed on Feb. 14, 2019, each of which is incorporated herein by reference in its entirety.

FIELD OF THE INVENTION

The present invention relates to methods and systems employing augmented reality techniques via real-world objects for communication and other purposes. In broad terms, the invention provides computer implemented methods for animated augmentation of real-time video of static real-world physical objects.

BACKGROUND OF THE INVENTION

Collaborative Mixed Reality (CMR) systems allow multiple distributed users to access the same shared Mixed Reality environment. This allows a more natural approach to mediated social interaction, in which multiple remote users can collaborate and interact with each other through digital displays in a shared distributed mixed reality context. We build upon this by means of tele-present augmented reality to introduce an Intermediated Reality (IR) framework.

Intermediated Reality uses real-world objects brought to life as a channel to send and receive messages or signals. These are the sender's intermediary and the receiver's intermediary, which are responsible for embodying and emitting information using physical real-world objects "brought to life". These objects act as real-world representations of the sender or the receiver in a remote venue. The messages or signals may be shared among multiple sender/receivers in multiple venues.

SUMMARY OF THE INVENTION

The present invention provides computer implemented methods and associated systems and devices whereby a real-world object at one location is animated using data obtained from video of a human subject captured at another location (or, in some applications, at the same location, and, in some applications, multiple locations). Features of the human subject are mapped to features of the real-world object and the real-world object is animated on the basis of movements of the human subject, through augmentation and modification of the video image of the real-world object. In many implementations, the features mapped to the object are, or include, facial features and the object is animated on the basis of facial movements (e.g. facial expressions, movements of mouth and lips, eyes, eyebrows, etc.). In many implementations, the real world object is animated in synchronism with a voice recording of the human subject captured along with the video. If required, the transmitted data can be securely encoded in an encrypted audio and movement data transmission format.

The invention includes:
computer-implemented methods as described herein;
computing devices and/or systems programmed, configured or otherwise adapted for implementing those methods; data processing apparatus and/or devices and/or systems comprising means for carrying out the methods; data processing apparatus and/or devices and/or systems comprising a processor adapted or configured to perform the methods;
computer program products for implementing those methods, including: computer program products comprising instructions which, when the program is executed by a computer, cause the computer to carry out the methods; computer-readable storage media comprising instructions which, when executed by a computer, cause the computer to carry out the methods; computer-readable data carriers having stored thereon the computer program products; data carrier signals carrying the computer program; and non-transitory computer readable media having stored thereon software instructions that, when executed by a processor, cause the processor to carry out the methods.

While the invention, in many embodiments, applies to animating images of real-world objects captured at one location, in other embodiments it may involve animating actual real-world objects at that location. Where the present disclosure refers to animating objects, this includes animating either images of objects or the objects themselves, unless specifically stated or where the context implies one or the other. For the purposes of the invention, real-world objects may be static objects or may include moving and/or movable parts. The method may augment or extend the quality and variety of motion in a visually photorealistic manner. The animated image of the real-world object may, in some embodiments, be projected onto a portion of the real-world object, such as a head/face portion of an object such as an animated puppet or figurine.

The use of data based on motions captured at one location to animate real-world objects at another location is referred to herein as "tele-puppetry".

The term "Intermediated Reality" (IR) used herein refers to a tele-present augmented reality (AR) framework that enables mediated communication and collaboration for multiple users through the use of tele-puppetry.

Real-world objects that are animated by means of the present invention are generally three-dimensional (3D) objects, including toys, ornamental objects or the like, having features corresponding to human facial features (particularly but not exclusively eyes and mouths), and may be representations of humans, animals, machines or imaginary creatures, for example.

Applications of the Invention Include:
Communication between individuals at first and second locations, or multiple locations, where motions of individuals are used to animate real-world objects in the possession of themselves or other individuals, typically by the use of mobile computing devices such as mobile phones.

Compelling storytelling using Augmented Reality, where motions of a storyteller are used to animate a real-world object in the possession of a listener.

Remote telepresence among two or more peers using the medium of animated physical objects.

Incorporation into gameplay and other interactive applications.

Fast facial posing of physical puppets in Stop Motion Animation.

In accordance with one aspect, the invention provides a computer implemented method comprising:
receiving, by a first computing device, first data defining features and movements of a human subject;

capturing, by the first computing device, a video image of an object having features corresponding to human features;

mapping, by the first computing device, features defined by the first data to corresponding features of the object;

using, by the first computing device, the first data to animate the corresponding features of the object so as to correspond with the movements of the human subject defined by the first data.

The object may be physical three-dimensional (3D) object. The method may further include positioning and orienting a 3D mesh representation of the physical object in registration with the video image of the physical object, prior to mapping the features defined by the first data to corresponding features on the 3D mesh representation of the of the object.

The method may further include displaying, by the first computing device, the animated object.

The video image of the object may be captured using a camera of, or associated with, the first computing device. Animating the object using the first data may comprise augmenting a camera feed from the camera while imaging the object using the camera.

The first data may be acquired using a camera observing the human subject.

The first data may be received by the first computer device via a data communications network. The first data may be generated by and transmitted from a second computing device. The first data may be transmitted from the second computing device, via a data communications network, to a server configured to process the first data and to transmit the first data to the first computing device.

In some embodiments:
the first data received by the first computing device comprises data defining facial features and movements of the human subject;
the object includes facial features corresponding to human facial features;
capturing, by the first computing device, the video image of the object includes capturing facial features of the object corresponding to human facial features;
the method further includes positioning and orienting a 3D mesh representation of the object in registration with the video image of the object, prior to mapping the features defined by the first data to corresponding features on the 3D mesh representation of the of the object;
mapping, by the first computing device, features defined by the first data to corresponding features of the object includes mapping the facial features defined by the first data to corresponding facial features of the object;
using, by the first computing device, the first data to animate the corresponding features the object includes using the data defining the facial movements of the human subject to animate the facial features of the object so as to correspond with the facial movements of the human subject defined by the first data.

In some embodiments, the first data further includes audio data of a voice recording of the human subject corresponding to the facial movements of the human subject, and using the data defining the facial movements of the human subject to animate the facial features of the object includes using the data defining the facial movements of the human subject to animate the facial features of the object in synchronism with the audio data. Playback of the audio data may be spatially positioned to match the position and orientation of the object in a display of the object or to match a real-world spatial location of the object.

In some embodiments, the audio data comprises a voice message of the human subject captured by a second computing device along with video of the human subject, and the first data first data defining the features and movements of the human subject is generated by the second computing device from the captured video.

The method may further include displaying, by the first computing device, the animated object in synchronism with playback of the audio data.

In some embodiments, the first data comprises expression data including blend shape data and transform data for each frame of a plurality of frames represented by the expression data. The expression data may be recorded in a file, such as a JavaScript Object Notation (JSON) file.

In some embodiments, the expression data and audio data is acquired by the first device and, while the object is being imaged by a camera of, or associated with, the first device, the first device applies the expression data to a camera feed from the camera to animate the image of the object in synchronism with playback of the audio data.

The first data may be securely encoded in an encrypted data transmission format.

In some embodiments, the first device includes a 3D computer model of the object that is used by the first device, along with the expression data, to animate the object.

In some embodiments, the 3D computer model comprises data defining a 3D mesh representing the surface geometry of the object and blend shape information that maps blend shape elements to regions of the 3D mesh. In some embodiments the 3D computer model further includes reconstruction map data defining features that are not visible in the physical object.

In some embodiments, where the video image of the object is captured using a camera of, or associated with, the first computing device, texture map data for the object may be obtained from the camera feed.

In some embodiments, while the object is being imaged, for each frame of the camera feed and in real time, the method includes:
positioning and orienting the 3D mesh of the object in registration with the image of the object;
generating texture map data for the object from the camera feed;
modifying the position and orientation of the image of the object using the transform data from the expression data for a corresponding frame of the expression data;
mapping the blend shape data from the expression data for that frame to corresponding regions of the 3D mesh of the object; and
modifying the image of the object using the blend shape data, the texture map data and the reconstruction map data to correspond to the expression defined by the expression data for that frame.

In some embodiments, the method further includes displaying the modified image on a display of (or associated with) the first device.

The object having features corresponding to human features may be a 3D real-world object and the 3D real-world object may be one of:
a static object; and
an object having moving and/or movable parts.

In some embodiments, the animated object may be displayed by projecting an image of the animated object onto a portion, such as a head/face portion, of a 3D real-world object.

The first data may be received by a plurality of computing devices and each of the computing devices may use the first data to animate a different object. One or more of the plurality of devices may generate first data for use by one or more other devices of the plurality of devices.

The first data is used to enable interactions with real-world objects, including gaming and other interactive experiences, and/or to identify connection opportunities and recommendations to other virtual or real-world applications.

BRIEF DESCRIPTION OF THE DRAWINGS

Embodiments of the invention will now be described, by way of example only, with reference to the accompanying drawings, in which:

FIG. 2 is an example of content of a JSON file containing expression data, in accordance with an embodiment of the invention;

DESCRIPTION OF PREFERRED EMBODIMENTS

References mentioned in the following description are listed in full at the end of the description and the content thereof is incorporated herein by reference.

Figure 1:
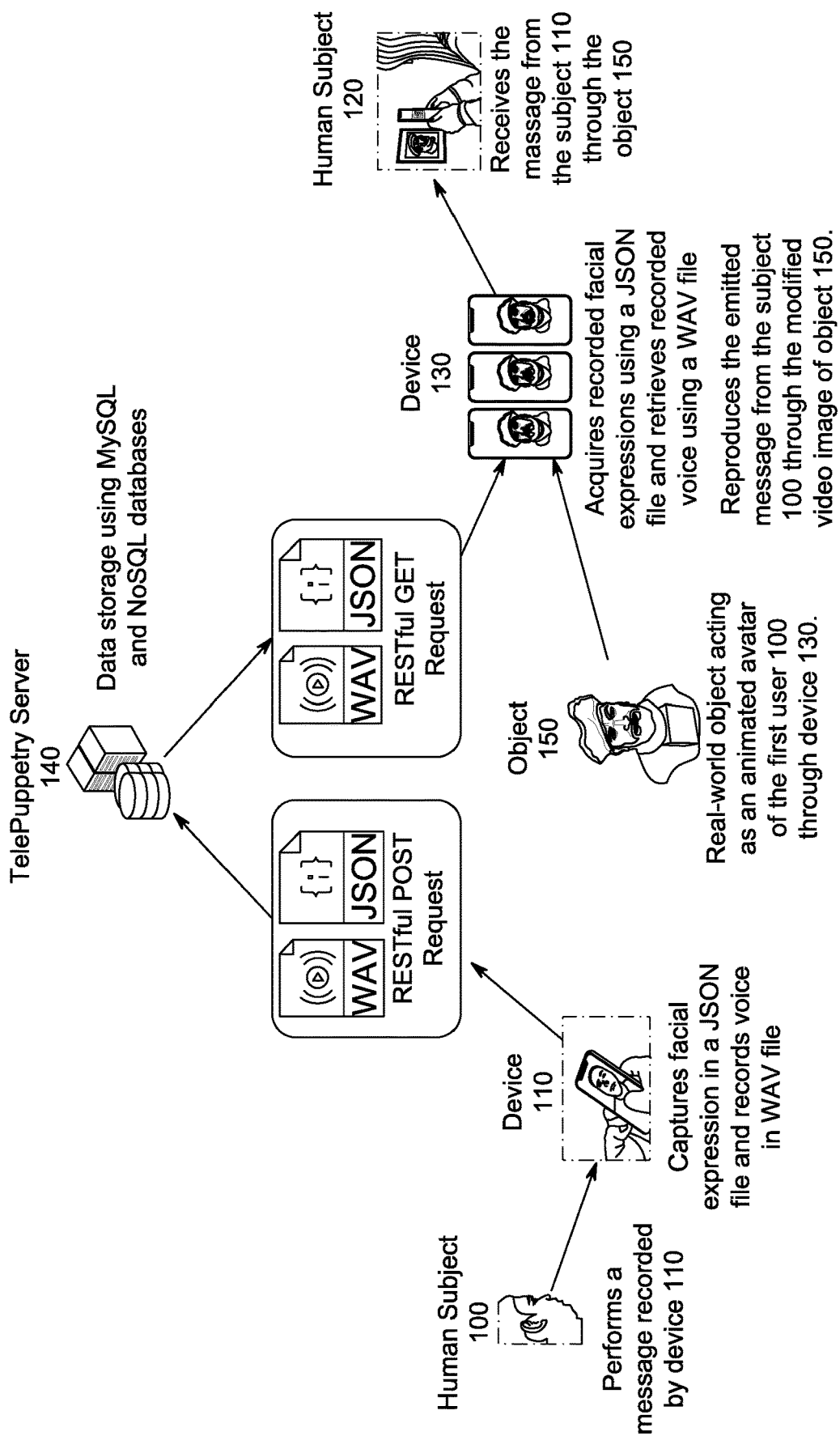
FIG. 1 is a block diagram illustrating an embodiment of the invention, in accordance with an embodiment of the invention.
Figure 3A:
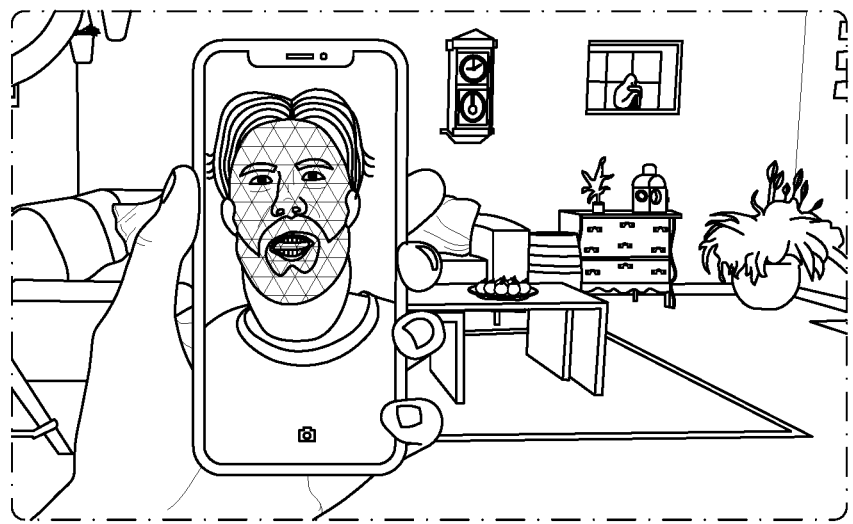
FIG. 3a illustrates an example of a human user (second user) recording a message containing voice audio with synchronous facial expressions, in accordance with an embodiment of the invention.
Figure 3B:
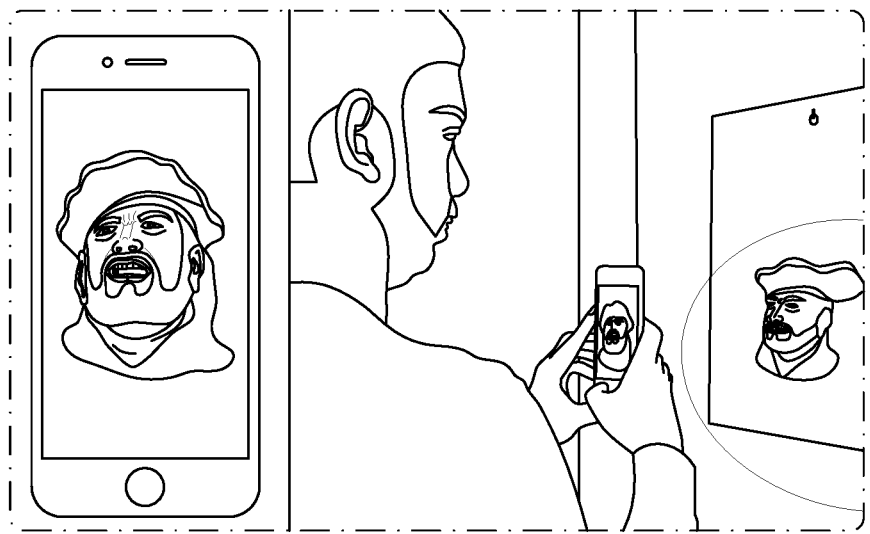
FIG. 3b illustrates another human user (first user) reproducing the sender's message through a first real-world object in Augmented Reality (AR), in accordance with an embodiment of the invention.
Figure 3C:
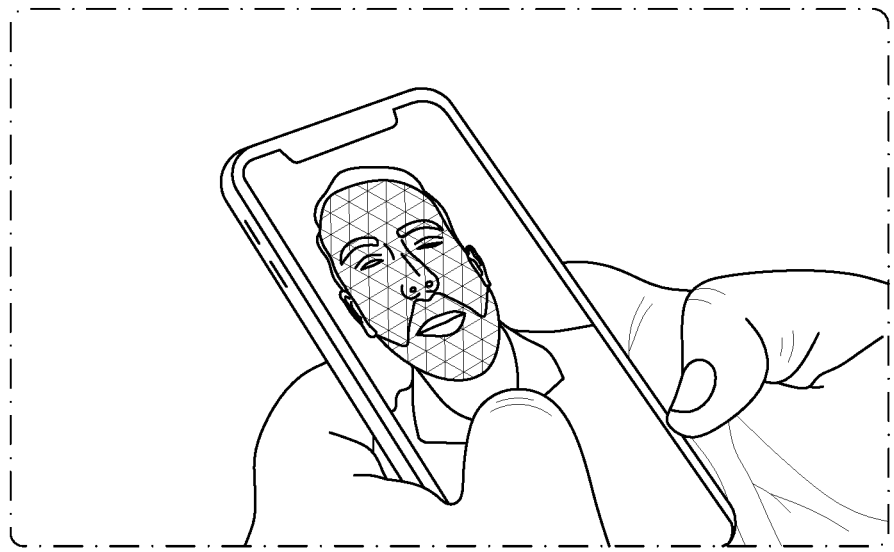
FIG. 3c illustrates the first user recording a reply message containing voice audio with synchronous facial expressions, in accordance with an embodiment of the invention.
Figure 3D:
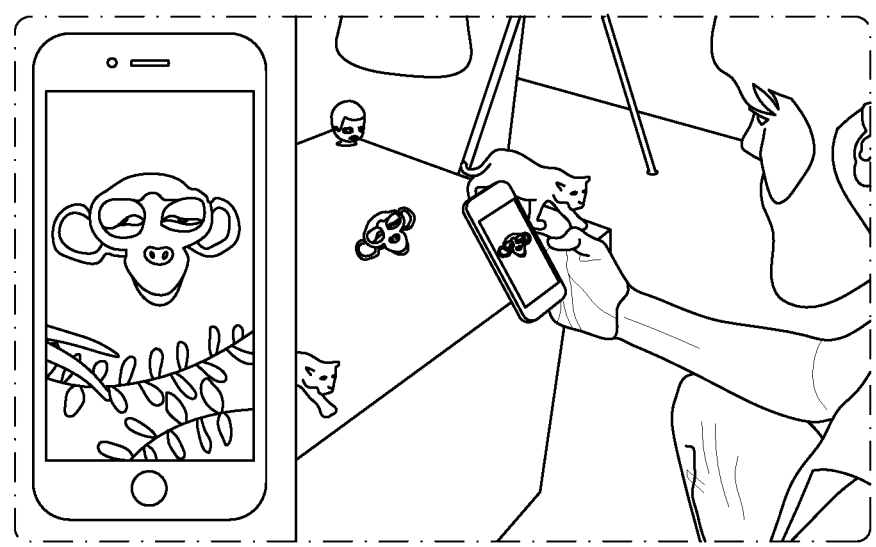
FIG. 3d illustrates the second user reproducing the reply from his previous message through a second real-world object in AR, in accordance with an embodiment of the invention.

As illustrated in FIG. 1, in a first example of an embodiment of the invention a first human user 120 using a first computing device 130, typically a mobile computing device such as a smartphone, receives a communication with a second human user 100 using a second computing device 110, again typically a mobile computing device such as a smartphone, via a data communications network. In most embodiments, the users 100, 120 communicate via a server 140 that is configured for the purposes of the invention (referred to herein as a "tele-puppetry server" or "TP server"). At least one of the users 100, 120 (in this example at least the first user 120) is in possession of a 3D real-world object 150, such as a toy or ornament, that has features corresponding to human features, including facial features (particularly but not exclusively eyes and a mouth). The object 150 may, for example, be a representation of a human, an animal, an imaginary creature, or a machine, humanoid robot or the like.

The first and second computing devices can be any computing device, such as a mobile device (e.g., smartphone, laptop or tablet computer), desktop computer or server; and the network can be any type of network such as a Local Area Network (LAN), Wide Area Network (WAN) or the Internet.

A mobile computing device may be a mobile wireless device, a mobile communication device, a tablet, a handset, or other type of mobile wireless computing device. The mobile device may include one or more antennas that are configured to communicate with a hotspot, base station, or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device may communicate in a WLAN, a WPAN, and/or a WWAN.

A mobile computing device may further include a microphone and one or more speakers that may be used for audio input and output. A display screen of the mobile device may be a liquid crystal display (LCD) screen, or other type of display screen such as an organic light emitting diode (OLED) display. The display screen may be configured as a touch screen. The touch screen may use capacitive, resistive, or another type of touch screen technology. An application processor and a graphics processor of the device may be coupled to internal memory to provide processing and display capabilities. A keyboard may be integrated with the mobile device or wirelessly connected to the mobile device to provide additional user input. A virtual keyboard may also be provided using the touch screen. A camera located on the front (display screen) side or the rear side of the mobile device may also be integrated into a housing of the mobile device.

Data communications networks may utilise any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others.

The term "software" refers generally to a set of computer-executable instructions, code or programs instructing a computer to do specific tasks. Scripts, applications, programs and a set of instructions are all terms often used to describe software.

Computer-executable instructions can be part of, for example, a dedicated software application or a software application that is accessed via a web browser or other software application (such as a remote computing application). Such software can be executed, for example, on a single computing device or in a network environment using one or more network computers. Software may be written in C++, Java, Perl, JavaScript, Adobe Flash, or any other suitable programming language. Computer-executable code may include microcode, assembly language code, a higher-level language code, or the like. Such code may include computer readable instructions for performing various methods. The code may form portions of computer program products.

Software may be tangibly stored on one or more volatile, non-transitory, or non-volatile tangible computer-readable media, such as during execution or at other times. Examples of tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. Memory may include volatile memory components (e.g., DRAM, SRAM), or non-volatile memory components (e.g., flash memory, disk drives). Computer-readable storage media can be contained in computer-readable storage devices such as solid-state drives, USB flash drives, and memory modules.

The second user (human subject) 100 uses their device 110 to record a "selfie" video that, in this example, includes a voice message. The video of the second user 100 may be captured using a camera that is part of, or is otherwise associated with, the second computing device 110, such as a front facing camera of a smart phone.

First software (which may be referred to as "capture software") on the device 110 extracts data from the video recording that defines facial features of the second user 100, and movements/expressions thereof corresponding to the voice message. This data is referred to herein for convenience as "expression data". The corresponding voice message is referred to herein as "audio data." The expression data may also be referred to as "first data", and the first data may also include the audio data.

As described further below, the capture software may operate in cooperation with a depth enabled camera (sometimes referred to as a RGB-D camera) in conjunction with other software that is native to or otherwise installed on the device, such as face-tracking software that is increasingly being integrated into, or is otherwise available for use on, smartphones and other computing devices, as discussed further below.

The expression data and audio data are transmitted from the second device 110 to the first device 130 via the TP server 140. The first user 120 uses their device 130 to capture a video image of the object 150. Second software (which may be referred to as "playback software") on the first device 130 maps features defined by the expression data to corresponding features of the object 150 and uses the expression data to animate the corresponding features of the object 150 so as to correspond with the movements of the second user 100 defined by the expression data, and displays the animated image to the first user 120 in synchronism with playback of the audio data. The first user 120 thus sees and hears the second user's video/voice message with the object 150 acting as an animated avatar of the second user 100. The playback software may also operate in cooperation with other software that is native to or otherwise installed on the second device 130.

The video image of the object 150 may be captured using a camera that is part of, or is otherwise associated with, the first computing device 130, such as a rear facing camera of a smartphone. Animating the object using the first data may comprise augmenting a camera feed from the camera while imaging the object 150 using the camera.

If both users are in possession of objects 150 (which may be identical, similar or completely different objects), and their devices 110, 130 each include the first software and the second software, then the users may engage in two-way, turn-based interaction via tele-puppetry in which each user's object 150 is animated using expression and audio data received from the other user. The first software and the second software may be integrated in a single application that is installed on each user's device. Other embodiments may be configured for one way tele-puppetry communication from the second user to the first user, e.g. so that the second user can tell a story to the first user (which might be transmitted in segments) via animation of the first user's object. In this case the second user's device only requires the first software and the first user's device only requires the second software, although each device could still have the same software, configured only for capture at one end and only for playback at the other end. It will be appreciated that the software provided on each user's device may be adapted and/or configured to enable different modes of communication and may enable communication between more than two users; e.g. one or more users may transmit and/or receive the same or different communications to and/or from one or more other users.

The TP server 140 may provide, or be part of, a TP platform that allows users to register and use TP services. The TP platform may be a stand-alone platform or may be integrated with or otherwise associated with one or more other platforms, such as social media platforms.

The object 150 may be an object that is selected (e.g. purchased) by a user from a range of objects that are made available for use with the TP platform, either by the TP service provider or from third parties. The object 150 is registered with the playback software on the second device 130. Registration of the object 150 may include establishing a 3D computer model of the object that is used by the playback software, along with the expression data, to animate the video stream of the object 150 that is captured using the camera of the second device 130. The computer model may typically comprise data defining a 3D mesh representing the surface geometry of the object 150, blend shape information that maps blend shape elements to regions of the mesh, and reconstruction map data that is used in conjunction with the mesh, and with texture map information that is obtained in real time from the camera feed of the object during playback, in order to enable the animated object to include detail of features, such as teeth, the tongue and inner mouth, that are not visible in the physical object 150.

The physical object 150 might be manufactured specifically for use in a TP system, in which case the computer model for a particular object may be generated in the process of designing and producing the object and provided to the user by the supplier of the object. A user might be able to obtain a customised object produced, for example, by 3D printing. A suitable 3D computer model of any object could be produced by any suitable method, such as using photogrammetric scans.

Embodiments of the capture software are described herein with particular reference to the use of a TrueDepth camera and associated ARKit API from Apple, Inc. (see https://developer.apple.com/documentation/arkit, https://developer.apple.com/documentation/arkit/creating_face-based_ar_experiences) for capturing expression data. The TrueDepth camera uses infra red dot projection to create a 3D mesh model of the user's face. ARKit enables the TrueDepth camera to be used to provide real-time information about the pose and expression of the user's face for use in rendering virtual content. In particular, the ARKit API incudes blend shapes, a dictionary of named coefficients (referred to herein as "keys" or "expression elements") representing the detected facial expression in terms of the movement of specific facial features.

Each key/expression element in this dictionary (an ARFaceAnchor.BlendShapeLocation constant) represents one of many specific facial features recognized by ARKit. The corresponding value for each key is a floating point number ("float number" or "weight") indicating the current position of that feature relative to its neutral configuration, ranging from 0.0 (neutral) to 1.0 (maximum movement).

Blend shape coefficients can be used to animate a 2D or 3D character in ways that follow the user's facial expressions. ARKit provides many blend shape coefficients, resulting in a detailed model of a facial expression, for example jawOpen, eyeBlinkLeft, and eyeBlinkRight coefficients. Blend shape coefficients can be used to record a specific facial expression for later use. Each type of blend shape coefficient is mapped to a region of the 3D mesh model of the user's face. In addition to blend shape data, the expression data includes transform data defining the position and orientation of the user's face in the frame. An example of a set of 52 expression elements applied to a real-world object is shown in FIG. 5. The "idle" expression represented at the top left corresponds to the appearance of the physical object and the other representations show modified versions of the idle expression corresponding to each blend shape, "left eyebrow down", "right eyebrow down", etc.

Other available RGB-D camera systems and/or software provide similar or equivalent functionality and can also be used for the purposes of the present invention.

In embodiments of the invention, the capture software operates in conjunction with ARKit to capture expression data, including blend shape data and transform data for each frame of the first user's video message. The expression data may be recorded in a file, such as a JavaScript Object Notation (JSON) file for transmission, along with the audio data, to the TP server 140. FIG. 2 shows an example of the partial content of a JSON file for one frame of a sequence of frames that are recorded in the file, which includes a float number value (weight) for each expression element for that frame along with transform data for that frame. Only a part of the complete set of expression elements, e.g. as represented in FIG. 5, is illustrated.

The expression data and audio data is acquired by the second device 130 from the TP server 140 and, while the object 150 is being imaged by the camera of the second device 130, the playback software applies the expression data to the camera feed to animate the image of the object 150 in synchronism with playback of the audio data.

More particularly, while the object 150 is being imaged, for each frame of the camera feed and in real time, the capture software:

positions and orients the 3D mesh of the object 150 in registration with the image of the object;
generates texture map data for the object;
modifies the position and orientation of the image of the object using the transform data from the expression data for the corresponding frame of the first user's message;
maps the blend shape data from the expression data for that frame to corresponding regions of the 3D mesh of the object 150;
modifies the image of the object using the blend shape data, the texture map data and the reconstruction map data to correspond to the expression defined by the expression data for that frame; and displays the modified image on a display of (or associated with) the second device 130.

The second user 120 thus sees a "live" image of the object 150, in its real environment, animated to mimic the expressions and movements of the first user while recording the video message, while listening to the recorded voice message.

FIGS. 3(*a*)-3(*d*) illustrate an example of (a) a human user (second user 100 in FIG. 1) recording a message containing voice audio with synchronous facial expressions; (b) another human user (first user 120 in FIG. 1) reproducing the sender's message through a first real-world object (150 in FIG. 1) in Augmented Reality (AR); (c) the first user recording a reply message containing voice audio with synchronous facial expressions; and (d) the second user reproducing the reply to his previous message through a second real-world object in AR.

FIGS. 4(*a*)-4(*d*) illustrate (a) an inanimate physical reference object and (b)-(d) frames from a sequence of frames showing the reference object brought to life in AR using Object Retargeting and Shadow Retargeting and Appearance Reconstruction, as discussed further below. The original object as seen in FIG. 4(a) has a closed mouth. As the mouth opens in the subsequent frames, the teeth and interior of the mouth that are occluded in the original object are reconstructed as described below.

Figure 4D:
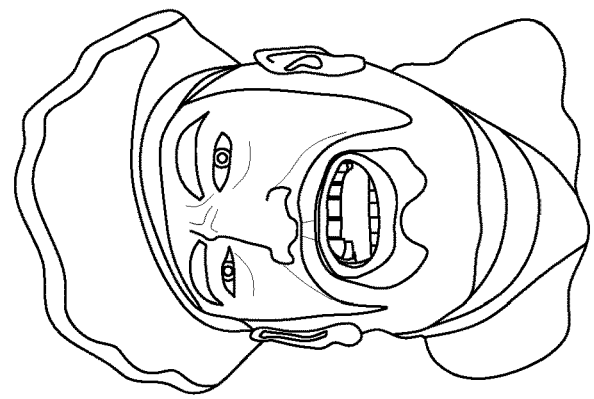
FIG. 4d illustrates a third frame from a sequence of frames, showing the reference object brought to life in AR, in accordance with an embodiment of the invention.
Figure 4C:
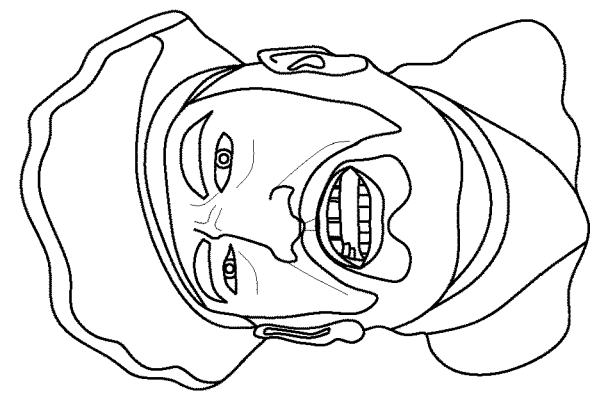
FIG. 4c illustrates a second frame from a sequence of frames, showing the reference object brought to life in AR, in accordance with an embodiment of the invention.
Figure 4B:
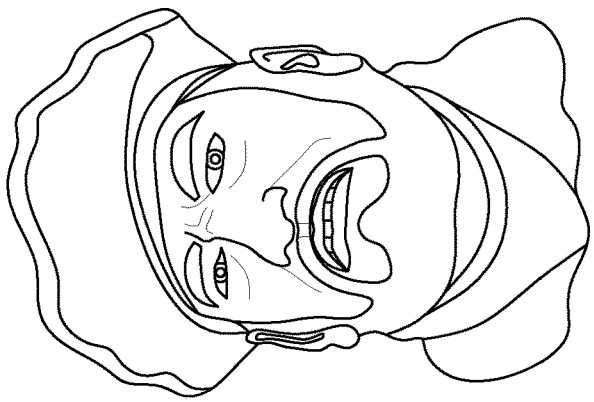
FIG. 4b illustrates a first frame from a sequence of frames, showing the reference object brought to life in AR, in accordance with an embodiment of the invention.
Figure 4A:
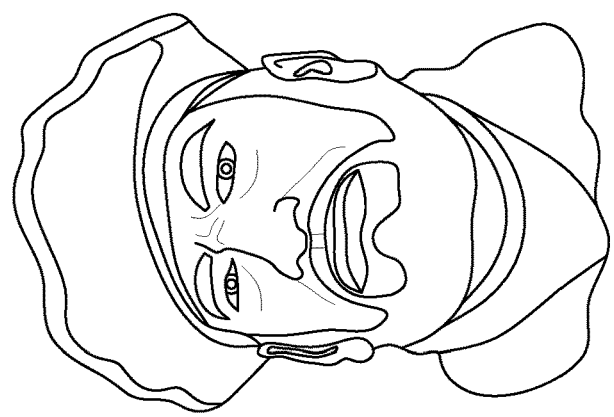
FIG. 4a illustrates an inanimate physical reference object, in accordance with an embodiment of the invention.
Figure 5A:
FIG. 5a illustrates a frame of an animated physical object in AR without reconstructing occluded areas that become revealed when the object is animated, in accordance with an embodiment of the invention.
Figure 5B:
FIG. 5b illustrates a frame with appearance reconstruction, in accordance with an embodiment of the invention.
Figure 5C:
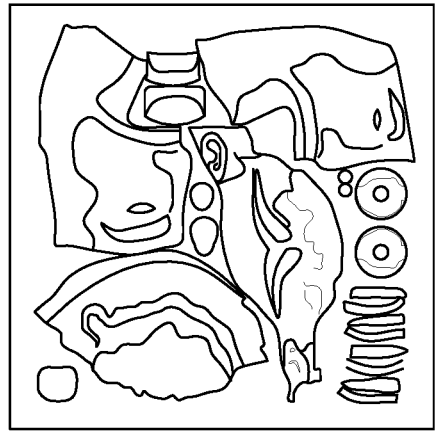
FIG. 5c illustrates an unwrapped texture map of a 3D mesh of the object, in accordance with an embodiment of the invention.
Figure 5D:
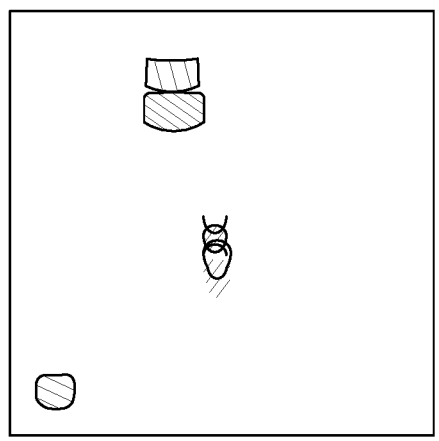
FIG. 5d illustrates a color encoded reconstruction map segmenting occluded areas of the object to be reconstructed in real-time, in accordance with an embodiment of the invention.

FIG. 5(a) illustrates the object of FIG. 4(a), in which the mouth of the object has been modified to be open but without reconstructing the occluded areas that should have become visible. FIG. 5(b) shows the frame with appearance reconstruction. FIG. 5(c) shows an unwrapped texture map of the 3D mesh of the object. FIG. 5(d) shows a color encoded reconstruction map segmenting occluded areas of the object to be reconstructed in real-time, as discussed further below.

Figure 6:
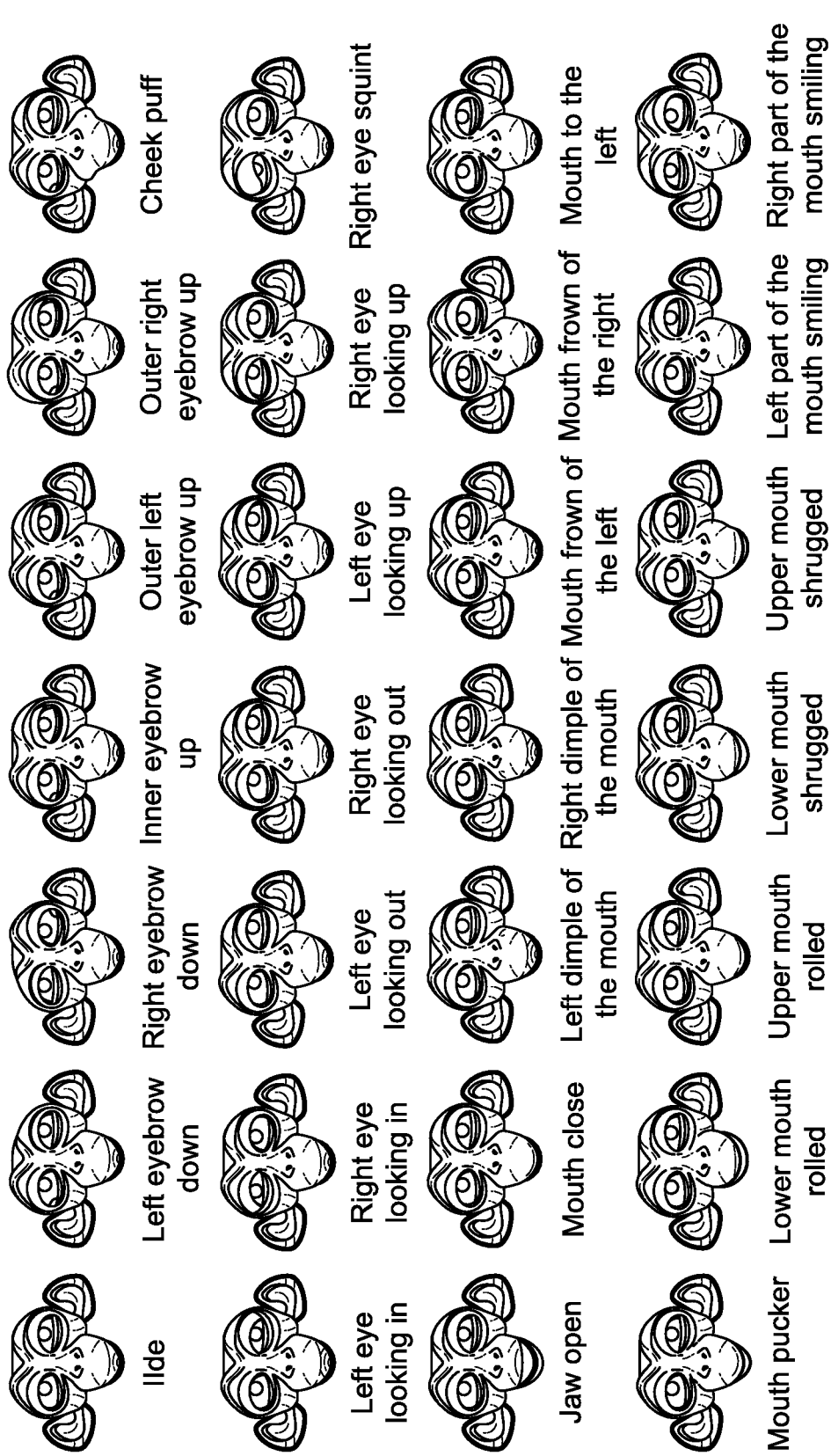
FIG. 6 illustrates an example of a set of 52 facial expression elements that get weighted individually according to the sender's message, in accordance with an embodiment of the invention.
Figure 6:
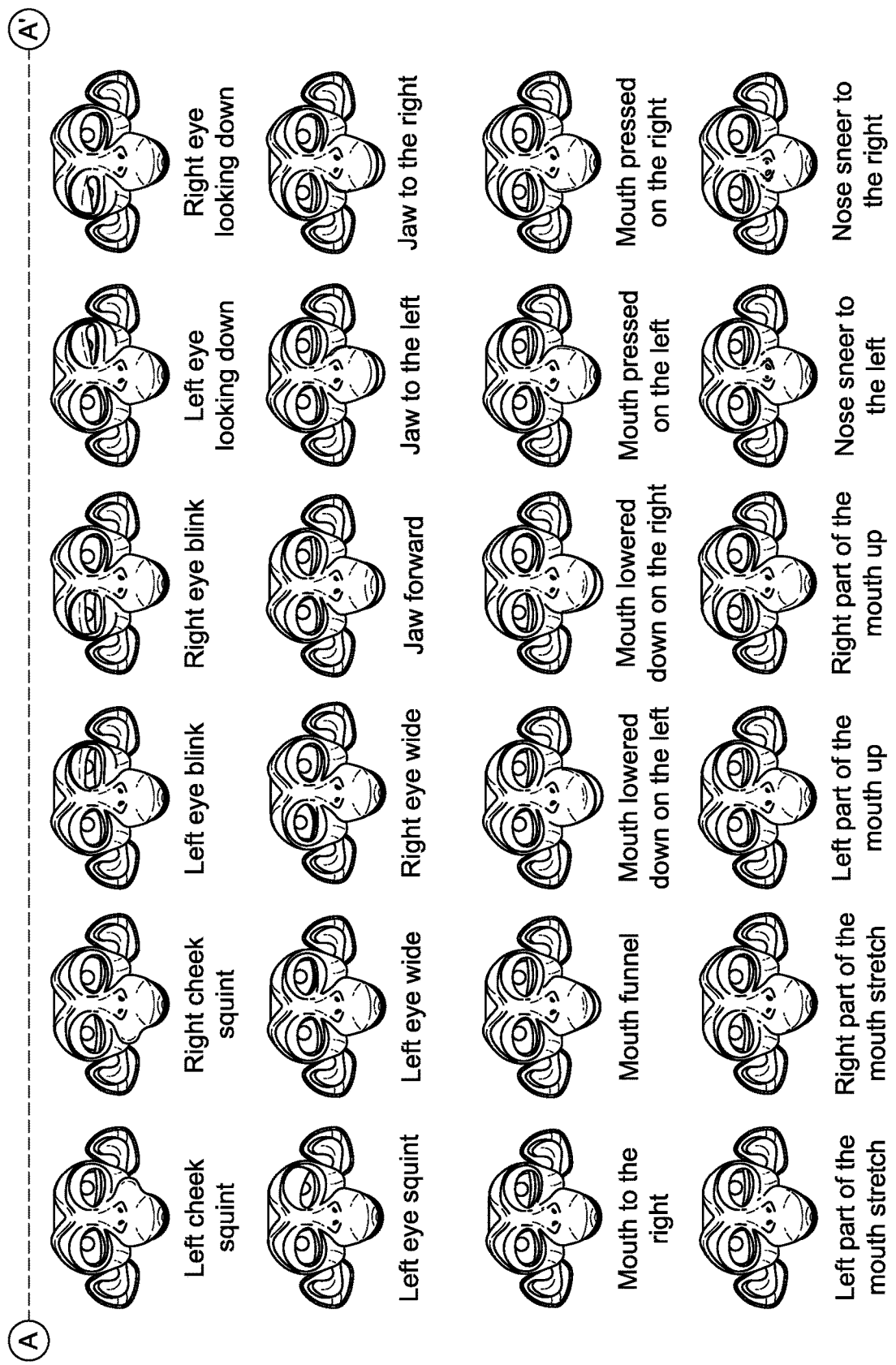

FIG. 6 illustrates an example of a set of 52 facial expression elements that are weighted individually according to the sender's message, as described above.

Figure 7A:
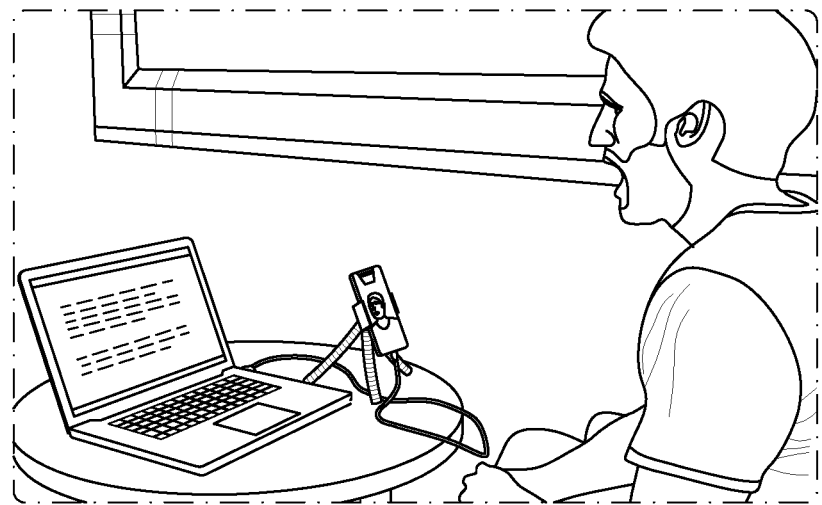
FIG. 7a illustrates a second user recording a story containing voice audio with synchronous facial expressions, in accordance with an embodiment of the invention.
Figure 7B:
FIG. 7b illustrates a first user in a remote location interacting with the recorded story through an object brought to life in AR, in accordance with an embodiment of the invention.

FIGS. 7 (a) and 7(b) illustrate (a) a second user recording a story containing voice audio with synchronous facial expressions; and (b) a first user in a remote location interacting with the recorded story through an object brought to life in AR. This illustrates how the methods of the present invention can be applied for the purposes of compelling story telling, as discussed further below.

Figure 8C:
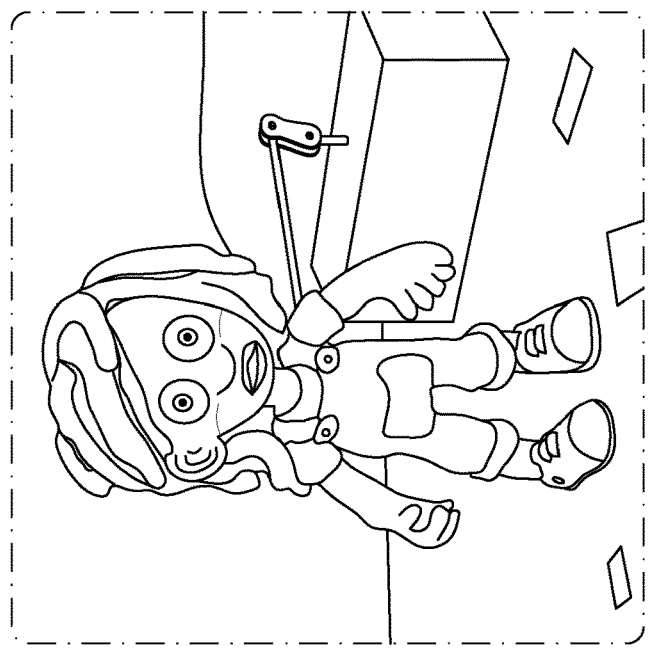
FIG. 8c illustrates a frame of an animation of the puppet with a corresponding facial expression created using photo-realistic AR, in accordance with an embodiment of the invention.
Figure 8B:
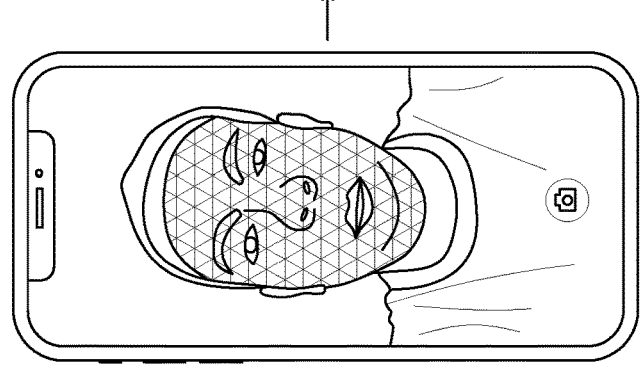
FIG. 8b shows a human user posing facial expressions to be applied to the puppet using his own mobile phone in accordance with an embodiment of the invention.
Figure 8A:
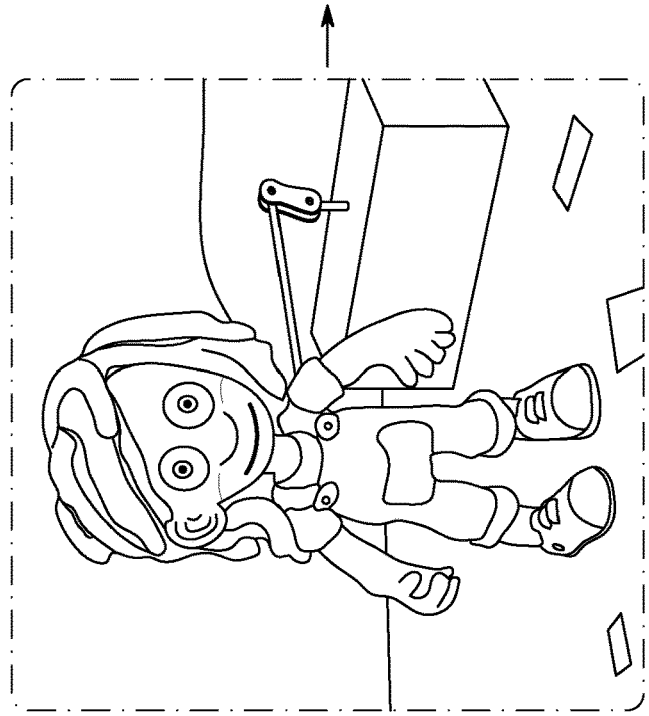
FIG. 8a illustrates a real-world stop motion puppet in an idle pose, in accordance with an embodiment of the invention.

FIG. 8(a) illustrates a real-world stop motion puppet in an idle pose. FIG. 8(b) shows a human user posing the facial expressions to be applied to the puppet using his own mobile phone. FIG. 8(c) shows a frame of an animation of the puppet with a corresponding facial expression created using photo-realistic AR in accordance with an embodiment of the invention. This illustrates how the methods of the present invention can be applied as a workflow tool for stop motion animation, as discussed further below.

Figure 9:
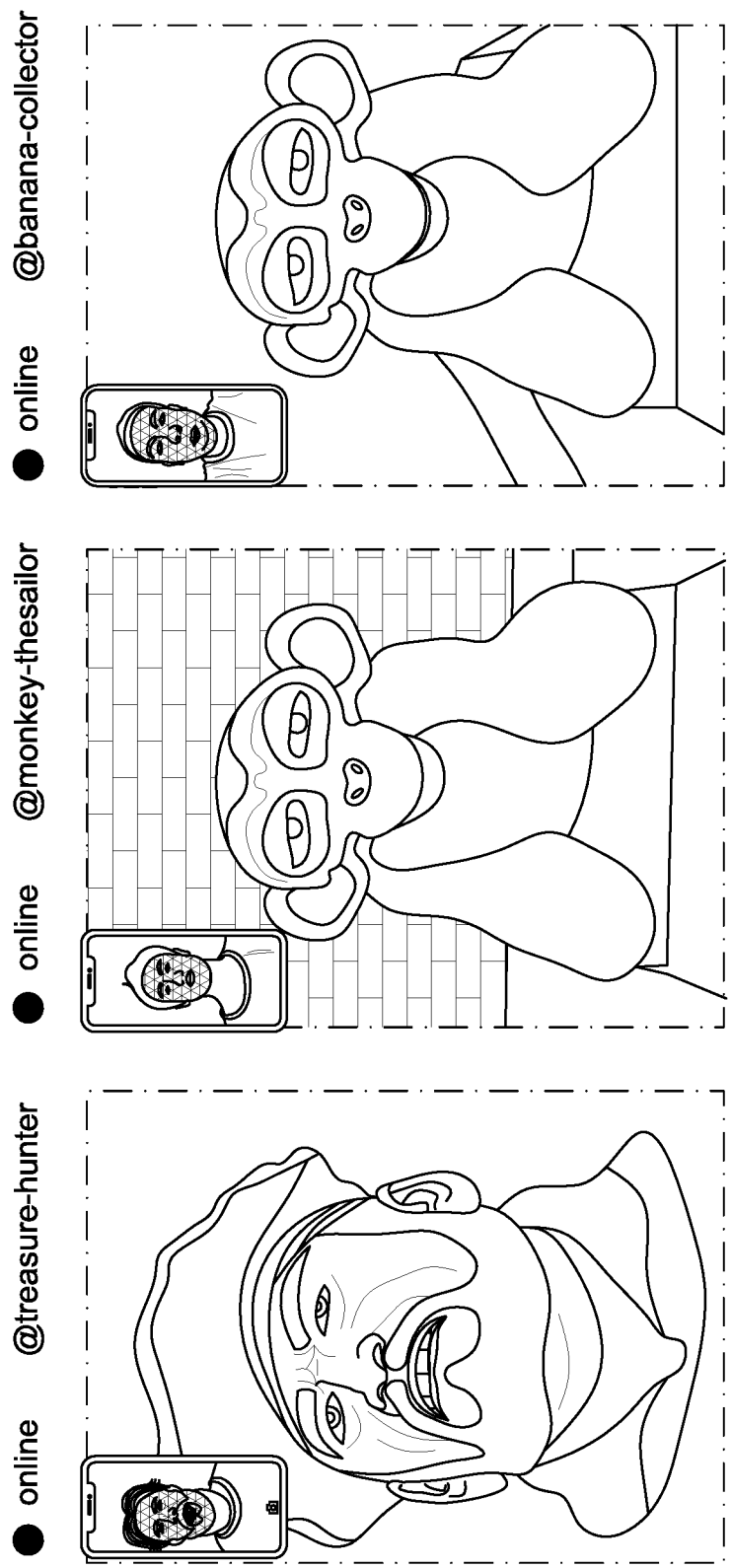
FIG. 9 illustrates a system for transmitting and receiving data among a plurality of devices, real world objects and human subjects in an online avatar chat scenario, with multiple physical objects and devices used by human subjects, each of whom are in different locations, in accordance with an embodiment of the invention.

FIG. 9 illustrates a system for transmitting and receiving first data among a plurality of devices, real world objects and human subjects in different remote locations. Such a system might be implemented, for example, in the form of a "chatroom" environment hosted by a server. Users may post messages to the chatroom, in the form of first data as described herein, and other users may choose to play back messages via physical objects in their possession. It will also be understood that, in some scenarios, a user may wish to record and play back messages themselves using their own objects.

The methods described herein may be implemented such that playback of audio data is spatially positioned (for example, assuming a stereo audio format, by varying the balance of the audio channels) to match the position and orientation of the physical object in a display of the object, or to match a real-world spatial location of the object.

Where required, the first data (expression/movement data and/or audio data) may be securely encoded in an encrypted data transmission format. The transport layer security protocol may encode and decode audio and movement data on the first device or central server, e.g. with initial and sporadic key handshake exchange. Device and associated human subject keys may have distributed verification and may be transiently held.

One embodiment of the invention, referred to herein as "ToyMeet", is a Collaborative Mixed Reality (CMR) system (see: Billinghurst and Kato (1999)) that allows turn based interactions between multiple remote participants. The sender (second user 100) first captures their selfie video and voice message locally The voice and facial expression data are transmitted to a database server (the TP server 150 of FIG. 1, described further below). Next, the receiver's device (first device 130) acquires the transmitted information from the database server 150. The obtained data is reproduced locally using AR in the receiver's physical toy 150. This real-world object acts as an intermediary, which is the physical entity of the tele-puppetry framework that reproduces the message recorded by the sender 100 (see FIG. 4). Seamless appearance of the physical deformed object is preserved using texture deformation (discussed further below).

In order to bring puppets to life in AR, the invention may employ "Appearance Retargeting" to bring to life the inanimate, static, real-world object 150, and preferably also the shadow of the object (discussed further below). For features/geometry that are not present in the physical object, such as teeth in a closed-mouth object, the invention employs "Appearance Reconstruction" (discussed further below).

Appearance Retargeting

Following the work of Casas et al. (2017), "Object Retargeting" may be performed using texture deformation from the real-world object. This method achieves an illusion of movement from the real-world object through image retargeting techniques using Augmented Reality. Such an approach allows a good degree of photo-realism in AR, since the material, lighting and shading of the virtual object are updated to the 3D mesh of the object 150 in each frame. Any changes occurring in the real-world environment while the video image of the object is being animated are represented in the texture applied to the 3D mesh in the FIG. 4 shows Object Retargeting integrated in the CMR system.

In the case for indirect re-lighting, following the work of Casas et al. (2018), the invention may employ "Shadow Retargeting". This method synthesizes virtual shadows directly by sampling the image that contains the shadow of the object presented in the real-world. As the 3D mesh is animated, this approach warps the real shadow to retarget its appearance to the virtual one. Where the warping samples an area outside the shadow, the appearance may be reconstructed using a search for sampling candidates. This method is of special relevance when facial expressions are integrated into the physical toy changing its appearance and shadow pose. FIG. 4 shows Shadow Retargeting integrated in the CMR system, where the shape of the shadow can be seen to change as the mouth of the animated image opens.

To achieve an accurate registration of the 3D mesh with the real-world object 150, embodiments may employ marker-less tracking for Augmented Reality, for example using Vuforia (2017). This method consists of a point-based cloud system that recognizes real-world objects. When detected, this point cloud records the origin of the world space coordinates in the framework. Other similar or equivalent techniques may be employed.

Appearance Reconstruction

For areas not present in the physical reference model, such as teeth and the interior part of the mouth it is necessary to reconstruct the appearance of the object in a plausible manner. The preferred method uses the 3D mesh that matches the shape of the physical object 150, so that it is possible to accurately establish the regions that will be revealed and are not represented in the real world object. Those areas may be paired with a part of the object 150 having an alike albedo and included in the reconstruction map data of the computer model of the object 150 in order to be reconstructed in real-time.

To do so, a texture map (FIG. 5(c)) of the object 150 is unwrapped onto the 3D mesh. This enables identification and segmentation of the regions that require such reconstruction, which may be done using a standard 3D modeling editor. Using the 3D mesh derived from the physical object, regions can be identified which will become revealed when blend shapes values are applied to the augmented object. These areas are not present in the real-world object used as a reference and will need to be reconstructed. To do so, the vertices from the geometry that will need to be reconstructed may be pre-identified, and hence, inpainted. These may be segmented by areas according to the element that they represent, e.g. upper teeth, lower teeth, inner mouth and tongue. Each element is color encoded in the reconstruction map (FIG. 5(d)) and paired to an area present in the real-world object that contains a desired similar appearance. This method applies only for cases in which the desired albedo can be sampled from a region that contains a similar appearance. Nonetheless, this in essence generalises to most puppets and humanoids as these tend to mimic and resemble the outlook and characteristics of humans. FIG. 4 shows Appearance Reconstruction integrated in the IR system.

Capturing Sender's Message

In order to allow turn based interactions between multiple remote participants, it is necessary to capture the message being emitted by the sender. To do so, procedures that may be employed to capture the user's voice and to acquire the user's facial expressions, as discussed above, will now be further described.

Recording Sender's Voice

The sender's voice is recorded with the microphone of their own mobile device 110. Each recording may be initialized, for example, when the user taps the screen of the device and finalized by a second tap. The captured audio may be buffered locally on the sender's mobile device and transmitted to the TP server of the IR system once the recording is finished (discussed further below) Once the file has been transmitted, the audio buffer may be erased from the user's device. The recorded voice is preferably encoded using a stereo, 16-bit non compressed Waveform audio file format (way) at 44.100 Hz.

Acquiring Sender's Facial Expressions

To acquire the sender's facial expressions, a depth-enabled mobile phone may be used that extracts facial features in real-time, for example using the ARKit API from Apple Inc.) (https://developer.apple.com/arkit/) as previously discussed. Using the ARKit API an ARFaceAnchor may be used to extract the facial features of the sender (https://developer.apple.com/documentation/arkit/arfaceanchor/2928251-blendshapes). In order to store the facial blendshapes sequentially, the values of the ARFaceAnchor may be serialized using the JavaScript Object Notation (JSON) file format in each frame. Each frame is a position in a sequential array. The preferred method records facial expressions at 30 frames per second.

In this embodiment, when the recording session is initialized a dynamic-sized array is allocated to memory. This array gets pushed with a new element on a per-frame basis until the recording finishes. Each element of this array is a dictionary that contains the normalized values of each captured blend shape from the ARFaceAnchor.

As described above, a recording session may be initialized simultaneously with the voice recording when the user taps the button displayed on the screen. For every frame in which the recording session is active, the normalized weights of their voice phonemes and facial features are stored (see FIG. 6 for the complete list of attributes). This information is stored locally on the sender's mobile device and transmitted to the TP server 140 of the IR system once the recording is finished. Once the data has been transmitted, this animation data buffer is erased from the second user's device 110.

Playing Messages on Animated Puppets

Using physical objects as a channel for tele-puppetry requires reproducing the message that has been captured by the sender as described above. The following sections further describe how animated 3D meshes of the physical object 150 are created and how these expressions are correctly synchronized with the audio at playback time.

Puppet Facial Expressions

The preferred method for bringing objects 150 to life through AR requires a 3D mesh of the object, as previously discussed, for texture deformation. In order to recreate the facial expressions of the sender, the captured blend shapes need to be reproduced into the 3D mesh. These may consist of a set of 52 key voice phoneme and facial features (see FIG. 6). A standard 3D editor, such as Autodesk Maya (https://www.autodesk.es/products/maya/overview) or Blender (https://www.blender.org/), may be used to create an animated 3D mesh for the object 150 that includes all possible deformations. Each blend shape received from the sender is normalized and weighted automatically with the registered 3D computer model of the object 150.

Adaptive Lip Syncing

As previously mentioned above, preferred embodiments use an uncompressed audio file system to record the user's voice. Specifically, preferred embodiments use the Waveform audio file format, more commonly known as way, due to its use of Linear Pulse Code Modulation (LPCM) encoding.

Pulse Code Modulation (PCM) is a method used to digitally represent sampled analogue signals. In a PCM transmission, the amplitude of the analogue signal is sampled regularly at uniform intervals, and each sample is quantized to the nearest value within a range of digital steps. The levels of quantification vary according to the wave amplitude in PCM encodings. However, in a Linear Pulse Code Modulation (LPCM), the quantization levels are linearly uniform within an audio transmission. This linearity allows adaptive synchronization of the correct facial expression at a given time according to the current LPCM sample. This synchronization is possible because the total number of frames recorded for facial expressions is known and these coincide exactly with the duration of the audio. Such adaptive synchronization is important when the frame rate of the reproduction device differs from the capturing hardware or when the rendering rate fluctuates and does not become constant.

To acquire the current frame (If J) adaptively, equation 1 below is calculated for each rendered frame. (s[t]) is the number of LPCM samples at a time t of the audio clip. (s) is the total duration of the audio clip in LPCM samples. (n) is the total number of recorded frames that contain facial expressions.

$$If J = \frac{s[t]}{\frac{s}{n}} \qquad (1)$$

Implementation

In order to use ToyMeet as a fluid and smooth collaborative IR system, optimized real-time data processing needs to be leveraged. The following sections describe how the sender's facial expressions are serialized over time for an optimal access time, how acquired data is transmitted to a remote server using binary blobs of encoded data for a minimized processing overhead, and a hybrid database storage approach that combines relational and non-relational models for low latency accesses.

Facial Blend Shapes Serialization

As described above, the sender's facial expressions are acquired along with the recorded voice message. In order to store the facial blend-shapes sequentially, their values are serialized using the JavaScript Object Notation (JSON) file format. When the session is initialized, a dynamic-sized array is allocated to memory. This array gets pushed with a new element on a per-frame basis until the recording finishes. Each element of this array is a dictionary that contains the normalized values of each captured blend-shape (see FIG. 6).

Data Transmission

To optimize for a low-latency communication, the serialized facial blend shapes and the recorded audio messages may be transmitted in a single server request. The system framework may stream the content using binary blobs of data in the form of a byte array. This data stream may consist of concatenated bytes from the JSON and WAV file using an XML structure. The binary stream of data may be transmitted to the server through a web socket that reads chunks of 8192 bytes at a time. Stream reading may happen until the file pointer has either reached the end of file or read the entire byte length. Read data may be temporarily stored in the memory of the server 140.

Database Storage

Once the data has been transmitted and is temporarily stored in the memory of the server, relational and non-relational databases may be used to store the data efficiently. In order to so, the XML structure may first be used to decode and split the byte array that contains the JSON and WAV files. These may be written to the server's disk and labelled using the current timestamp. A document-oriented database may be implemented following a NoSQL approach.

Non-relational (NoSQL) databases provide a mechanism for storage and retrieval of data that is modeled in means other than the tabular relations used in relational databases. While each implementation differs on the details of this definition, in general, they all assume that documents encapsulate and encode data in some standard formats or encodings. Documents are addressed in the relational (MySQL) database via a unique entry that represents that document. This approach allows for a fast retrieval of data since the only entry that is retrieved from the MySQL server is the name of the file that needs to be returned to the request. Alongside the JSON file, a URL may be returned that contains the remote location of the WAV file. This may be used for audio streaming in order to minimize the loading time at the user side.

Applications

The present IR framework is enables a diversity of applications in which a collaborative environment can be beneficial for the participants. The following sections proposes ToyMeet as a tool to enhance storytelling for children using puppets brought to life through mobile Augmented Reality, present the IR framework as a method of telepresence among peers using tele-puppetry as a channel of communication, and present the technique as a tool in which the puppet's facial expressions can be directed directly from a mobile phone using Augmented Reality.

Compelling Storytelling for Augmented Reality

As Goldstein (1994) evaluated, learning by playing is highly beneficial for child development. Most toys provide opportunities for children to explore and learn. The most successful are able to capture the children's senses, awaken their imagination and encourage them to interact with others. By using the present technique, enhance traditional toys can be enhanced with interactive storytelling. A user can be embodied into a real-world toy as the narrator of a compelling story (see FIG. 8).

Remote Telepresence Among Peers

Positive relationships between parents and children are important for all areas of children's development. By being in the moment, spending quality time and showing warmth, care and respect, the relationship with the child can be strengthened. However, due to the commitments of adults, sometimes parents must be absent for a certain period of time. When this happens, telepresence aims to reduce physical distance by giving the feeling of being in that other location through remote movements, actions or voice. The present technique can make use of augmented reality through traditional toys to reproduce recorded messages of close relatives. This makes both parents and children virtually closer, when in reality, both are far away from each other in the real world. Each of them interacts with other participants through animated physical puppets, helping to awaken the imagination of the child and improving the ability to socially interact with others (see FIG. 1).

Incorporation into Gameplay and Other Interactive Applications.

The methods described herein provides information for enhanced experiences with real-world objects and may be used to identify connection opportunities and recommendations to other virtual or real-world applications. The method extends existing features of real-world objects by enabling new interactions on them. The captured first data, (audio and blend shapes) can be uses to enable new applications in real-world objects using our technology, for example to enable gaming and other interactive experiences using real-world toys, dolls or figurines that otherwise are totally inanimate. Computer games and other interactive applications may include artificial intelligence components, whereby the first data could be used dynamically to generate connections and interactive experiences with other real world objects when the scenario is appropriate. Another example is where an individual might say a specific word to trigger an action or make a specific facial expression to trigger an action. A person's mood or degree of engagement may be identified from the first data in a particular context to infer what they like or dislike.

Fast Facial Posing of Physical Puppets in Stop Motion Animation

Accurately posing stop motion puppets for long-takes movies, frame by frame, is an analogue job that requires a high cost in resources and time. Following the work from Casas et al. (2018), in which in-between frames of a stop motion animation were generated, the amount of poses necessary to create a film were reduced. Using the same reference model, the present disclosure introduces a technique in which a character's facial expressions can be directed directly from a mobile phone using Augmented Reality.

The present disclosure proposes a method in which a 3D-printed puppet can be directed with the acquired blend shapes from a user. As previously discussed, the ARKit API, or equivalent tools, may be used to acquire the weighted values from the user and apply them to a rigged and skinned mesh that has the same exact shape as the physical one. This requires to create the 52 key voice phoneme and facial features (see FIG. 7) for each character of a movie. This technique allows high fidelity with the desired result and an accurate synchrony of lips with the recorded audio (see FIG. 9).

EXPERIMENTAL ASSESSMENT

The present "tele-present Mixed Reality" (TMR) system targets mobile devices as the platform in which the user experiences mediated communication through tele-puppetry. For such requirement to happen, we stress the importance of an interactive frame rate and low-latency communication. The following section analyses the rendering performance in an Apple iPhone X and the subsequent section describes the system latency for miscellaneous mobile broadbands.

Rendering Performance

An experimental assessment was performed using an Apple iPhone X with an output resolution of 2436px by 1125px. This achieved interactive frame rates (23 fps) on this mobile phone.

As seen in Table 1 below, the primary bottleneck of the system is the Shadow Retargeting algorithm. As detailed in Casas et al. (2018), the sampling search for shadow reconstruction requires around 15 ms to achieve coherent results. The rest of the time invested in this algorithm is for shadow warping, auxiliary masks and Percentage Closer Soft Shadows (PCSS). On average, retargeting the shape of the shadow takes approximately two thirds of the render time per frame.

TABLE 1

Time breakdown of a typical frame processed using ToyMeet in an Apple iPhone X.

| Task | Time | Percentage |
| --- | --- | --- |
| AR Marker-less Tracking | 1.85 ms | 3.91% |
| Object Retargeting | 4.87 ms | 10.31% |
| Shadow Retargeting | 34.13 ms | 72.26% |
| Appearance Reconstruction | 2.64 ms | 5.59% |
| Background Inpainting | 2.78 ms | 5.88% |
| Scene Rendering | 0.96 ms | 2.03% |
| Total | 46.9 ms | 100% |

The remainder third of the render time per frame is invested in miscellaneous duties. The second substantial task, which takes around 10% of the rendering time per frame, is object retargeting. This section encapsulates duties such as transferring texture data from the camera feed, rendering the overlaid 3D mesh in a deformed position or assigning the weighted blend-shapes in real-time. Following this task, with an approximate 5% of the rendering time per duty, appearance reconstruction for occluded areas and background inpainting over uniform backdrops rank. Finally, marker-less AR tracking and scene rendering take the remainder 5% of the rendering time per frame.

System Latency

The framework is optimized for low-latency communications among participants. As ToyMeet is intended to work efficiently in mobile devices, the broadcasting times are analysed in different broadbands. In Table 2 below, the data size per frame is broken down, which can then be extrapolated for each second or by a sample message of 10 seconds. Each serialized JSON blend-shape frame takes the size of 2.045 KB. This includes the normalized weighted values of the 52 key phoneme and facial features (FIG. 6) and the position and rotation of the captured face in world coordinates. In addition to the blend-shapes, we record the synchronized audio using a stereo, 16-bit non-compressed WAV recording at 44.100 KHz. This has a bit-rate of 1411 Kbps, which sizes at 5.880 KB per frame. The combined captured data amount is 7.925 KB per frame.

TABLE 2

File size breakdown analyzed per frame, second and 10 seconds. Captured frame-rate is calculated at 30 fps. Recorded audio files are stereo, 16-bit at 44.100 KHz.

| File Type | Size per Frame | Size per Second | Size per 10 Seconds |
| --- | --- | --- | --- |
| Serialized blend-shapes (JSON) | 2.045 KB | 61.35 KB | 0.613 MB |
| Recorded Audio (WAV) | 5.880 KB | 176.4 KB | 1.764 MB |
| Total | 7.925 KB | 237.75 KB | 2.377 MB |

7,925 bytes per frame may seem like a small number, but when done at 30 fps in a slow broadband, the transmission time can be a challenge. As it can be seen in Table 3 below, this is specially the case for GPRS (2.5G) and EDGE (2.75G) connections, in which a sample message of 10 seconds could take almost 3 minutes to be transmitted. This is not the case for faster connections, such as HSPA (3G) or LTE (4G). In this case, data transmissions are well optimized and transmission times are as little as 0.38 seconds for a sample message of 10 seconds in a LTE broadband. Hence, it can be understood that for a smooth and low-latency communication the user should have at least a HSPA (3G) broadband. Currently, such connection has a penetration of 85% worldwide.

TABLE 3

Time breakdown for transmitting combined recorded audio and serialized blend-shapes in miscellaneous mobile broadbands analyzed per frame, second and 10 seconds. Calculated times do not take into account accidental lost packages caused by the user's environment, such as packet collision, radio interference or over-demanded service.

| Mobile broadband | Speed | Time per Frame | Time per Second | Time per 10 Seconds |
| --- | --- | --- | --- | --- |
| GSM GPRS (2.5G) | 0.115 Mbit/s | 0.55116 s | 16.535 s | 165.35 s |
| GSM EDGE (2.75G) | 0.237 Mbit/s | 0.26743 s | 8.023 s | 80.23 s |
| UMTS HSPA (3G) | 5.8 Mbit/s | 0.01090 s | 0.327 s | 3.27 s |
| LTE (4G) | 50 Mbit/s | 0.00126 s | 0.038 s | 0.38 s |
| WiFi | 100 Mbit/s | 0.00063 s | 0.019 s | 0.19 s |

The present disclosure introduces Intermediated Reality. This collaborative tele-present Mixed Reality (TMR) system is the first to propose a framework for mediated communication through the remote possession of toys or other objects that come to life in mobile Augmented Reality. This approach has shown how, as part of a two-way conversation, each person communicates through a toy figurine that is remotely located in front of the other participant. Each person's face gets tracked through the front camera of their mobile devices and the tracking pose information gets transmitted to the remote participant's device along with the synchronized voice audio, allowing a turn-based interaction chat.

Additionally, the present disclosure demonstrates how such a system could be used as a tool for enhancing storytelling to children using puppets brought to life in AR. We have proposed to embody a narrator into the enlivened toy to enrich creativity in children. Finally, we have showcased how our framework could rapid pose facial expressions in real-world puppets using AR. Our method would allow reductions in costs and time allowing a fast facial posing method for Stop Motion movies.

One limitation of the current system implementation is the difficulty to maintain video ingest for both front and rear facing cameras simultaneously on available mobile device operating systems, such as iOS. With this hardware/OS feature addressed, a concurrent TMR conversation method could be developed. System latency is masked seamlessly and effectively in the described embodiments by discrete scheduled messaging. A concurrent system, however, would further require a solution to address live 2-way streams of voice and animation data. on the use of compact efficient data transmission lends itself to this scenario in future work.

In applying the concept of IR more broadly, the present inventors foresee applications of the framework across the entire reality-virtuality continuum. Using full immersive Virtual Reality, in which the physical intermediary is not seen, the inventors anticipate the use of haptics systems and virtual characters for getting in touch with the receiver's physical space, Bierz et al. (2005). In a robotic telepresence scenario, in which the intermediary is a robot with spatial audio systems and physical animated facial expressions, the inventors envision the robot to be driven by the system using synchronized audio and captured facial data, Danev et al. (2017). In addition, the inventors see the intermediary element of the communication model with the capability to be a Time Traveller Proxy (TTP). As proposed by Tang et al. (2012), this would allow participants who are unable to attend a meeting to use pre-recorded messages to interact with other members. Using the system, ToyMeet, this could be done through a real-world delegate with synchronized audio and captured facial expressions. Hence, it will be understood that Intermediated Reality has a broad scope of applications in miscellaneous industrial sectors.

As may be recognized by those of ordinary skill in the art based on the teachings herein, numerous changes and modifications may be made to the above-described and other embodiments of the present disclosure without departing from the scope of the disclosure. It is further understood to one skilled in the art that improvements and modifications may be incorporated without departing from the scope of the disclosed invention embodiments herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device, method or structure that is configured in a certain way is configured in at least that way, but may also be configured in ways that are not listed.

The disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

The invention claimed is:

1. A computer implemented method comprising:
receiving, by a first computing device, first data defining features and movements of a human subject;
capturing, by the first computing device, a video image of an object having features corresponding to human features, wherein the object is a physical three-dimensional (3D) object;
positioning and orienting, by the first computing device, a 3D mesh representation of the physical object in registration with the video image of the physical object;
mapping, by the first computing device, features defined by the first data to corresponding features on the 3D mesh representation of the object; and
using, by the first computing device, the first data to animate the corresponding features of the object so as to correspond with the movements of the human subject defined by the first data.

2. The method of claim 1, further including displaying, by the first computing device, the animated object.

3. The method of claim 1, wherein the video image of the object is captured using a camera of, or associated with, the first computing device.

4. The method of claim 3, wherein animating the object using the first data comprises augmenting a camera feed from the camera while imaging the object using the camera.

5. The method of claim 1, wherein the first data is acquired using a camera observing the human subject.

6. The method of claim 1, wherein the first data is received by the first computer device via a data communications network.

7. The method of claim 1, wherein the first data is generated by and transmitted from a second computing device.

8. The method of claim 7, wherein the first data is transmitted from the second computing device, via a data communications network, to a server configured to process the first data and to transmit the first data to the first computing device.

9. The method of claim 1, wherein the first data received by the first computing device comprises data defining facial features and movements of the human subject and the object includes facial features corresponding to human facial features.

10. The method of claim 1, wherein:
capturing, by the first computing device, the video image of the object includes capturing facial features of the object corresponding to human facial features;
positioning and orienting a 3D mesh representation of the object in registration with the video image of the object, prior to mapping the features defined by the first data to corresponding features on the 3D mesh representation of the of the object;
mapping, by the first computing device, features defined by the first data to corresponding features of the object includes mapping facial features defined by the first data to corresponding facial features of the object; and
using, by the first computing device, the first data to animate the corresponding features of the object including using data defining facial movements of the human subject to animate the facial features of the object so as to correspond with the facial movements of the human subject defined by the first data.

11. The method of claim 1, wherein the first data further includes audio data of a voice recording of the human subject corresponding to facial movements of the human subject, and using the first data defining the movements of the human subject to animate corresponding features of the object includes using the first data defining facial movements of the human subject to animate corresponding facial features of the object in synchronism with the audio data.

12. The method of claim 11, wherein the audio data comprises a voice message of the human subject captured by a second computing device along with video of the human subject, and the first data defining the features and movements of the human subject is generated by the second computing device from the captured video.

13. The method of claim 11, further including displaying, by the first computing device, the animated object in synchronism with playback of the audio data.

14. The method of claim 13, wherein playback of the audio data is spatially positioned to match the position and orientation of the object in a display of the object or to match a real-world spatial location of the object.

15. The method of claim 1, wherein the first data comprises expression data includes blend shape data and transform data for each frame of a plurality of frames represented by the expression data.

16. The method of claim 15, wherein the expression data is stored in a file.

17. The method of claim 16, wherein the file is a JavaScript Object Notation (JSON) file.

18. The method of claim 1, wherein the first data comprises expression data and audio data acquired by a second computing device and, while the object is being imaged by a camera of, or associated with, the first device, the first device applies the expression data to a camera feed from the camera to animate the image of the object in synchronism with playback of the audio data.

19. The method of claim 1, wherein the first data is securely encoded in an encrypted data transmission format.

20. The method of claim 1, wherein the first device includes a 3D computer model of the object that is used by the first device, along with the first data, to animate the object.

21. The method of claim 20, wherein the 3D computer model comprises data defining a 3D mesh representing the surface geometry of the object and blend shape information that maps blend shape elements to regions of the 3D mesh.

22. The method of claim 21, wherein the 3D computer model further includes reconstruction map data defining features that are not visible in the physical object.

23. The method of claim 20, wherein the video image of the object is captured using a camera of, or associated with, the first computing device and texture map data for the object is obtained from a camera feed from the camera.

24. The method of claim 23, wherein the first data comprises expression data including blend shape data and transform data for each frame of a plurality of frames represented by the expression data, and wherein, while the object is being imaged, for each frame of the camera feed and in real time, the method further includes:
positioning and orienting the 3D mesh of the object in registration with the image of the object;
generating texture map data for the object from the camera feed;
modifying the position and orientation of the image of the object using the transform data for a corresponding frame of the expression data;
mapping blend shape data from the expression data for that frame to corresponding regions of the 3D mesh of the object; and
modifying the image of the object using the blend shape data, the texture map data and the reconstruction map data to correspond to the expression defined by the expression data for that frame.

25. The method of claim 1, wherein the object having features corresponding to human features is a 3D real-world object, and wherein the 3D real-world object is one of:
a static object; and
an object having moving and/or movable parts; and wherein, optionally:
the animated object is displayed by projecting an image of the animated object onto a portion, such as a head/face portion, of the 3D real-world object.

26. The method of claim 1, wherein the first data is received by a plurality of computing devices and each of the computing devices uses the first data to animate a different object.

27. The method of claim 26, wherein at least one of the plurality of devices generates first data for use by at least one or more other devices of the plurality of devices.

28. The method of claim 1, wherein the first data is used to enable interactions with real-world objects, including gaming and other interactive experiences, and/or to identify connection opportunities and recommendations to other virtual or real-world applications.

29. A computing device programmed, configured or otherwise adapted for implementing the method of claim 1.

30. A system comprising:
a memory; and
a processor in communication with the memory, wherein the system is configured to preform a method comprising:
receiving, by a first computing device, first data defining features and movements of a human subject;
capturing, by the first computing device, as video image of an object having features corresponding to human features, wherein the object is a physical three-dimensional (3D) object;
positioning and orienting, by the first computing device, a 3D mesh representation of the physical object in registration with the video image of the physical object;
mapping by the first computing device, features defined by the first data to corresponding features on the 3D mesh representation of the object; and
using, by the first computing device, the first data to animate the corresponding features of the object so as to correspond with the movements of the human subject defined by the first data.

31. A computer program product comprising:
a non-transitory computer readable medium readable by a processor and storing instructions for execution by the processor to perform a method that comprises:
receiving, by a first computing device, first data defining features and movements of a human subject;
capturing, by the first computing device, a video image of an object having features corresponding to human features, wherein the object is a physical three-dimensional (3D) object;

positioning and orienting, by the first computing device, a 3D mesh representation of the physical object in registration with the video image of the physical object;

mapping, by the first computing device, features defined by the first data to corresponding features on the 3D mesh representation of the object; and using, by the first computing device, the first data to animate the corresponding features of the object so as to correspond with the movements of the human subject defined by the first data.

\* \* \* \* \*